No. 744,742. PATENTED NOV. 24, 1903.
H. W. GANDER.
BALL BEARING FIFTH WHEEL AND KING BOLT.
APPLICATION FILED AUG. 14, 1903.
NO MODEL. 2 SHEETS—SHEET 1.
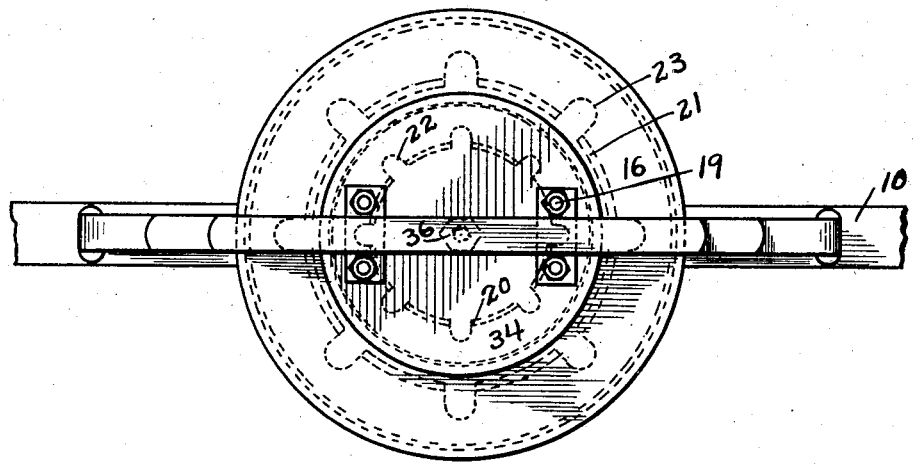
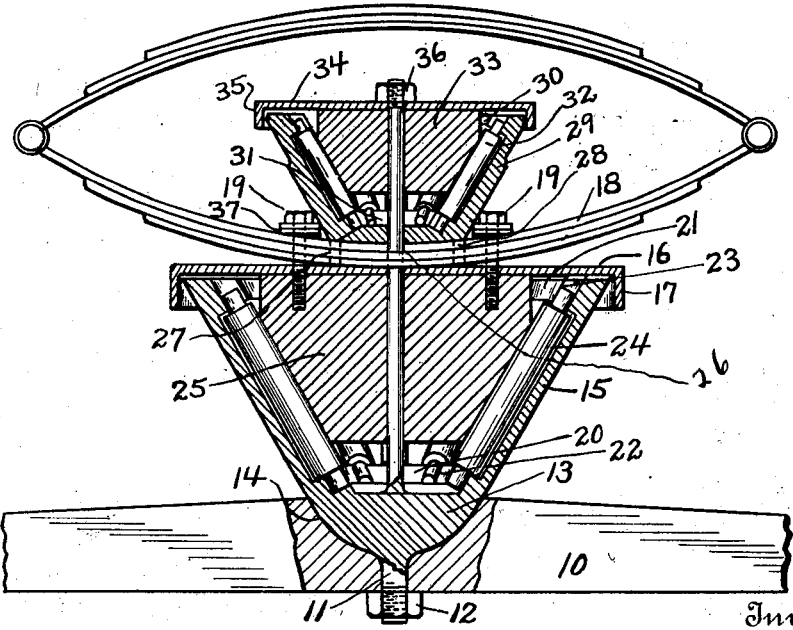
Witnesses
Charles Morgan
Ethel M. Catford
Inventor
H. W. GANDER.
Attorneys No. 744,742. PATENTED NOV. 24, 1903.
H. W. GANDER.
BALL BEARING FIFTH WHEEL AND KING BOLT.
APPLICATION FILED AUG. 14, 1903.
NO MODEL. 2 SHEETS—SHEET 2.
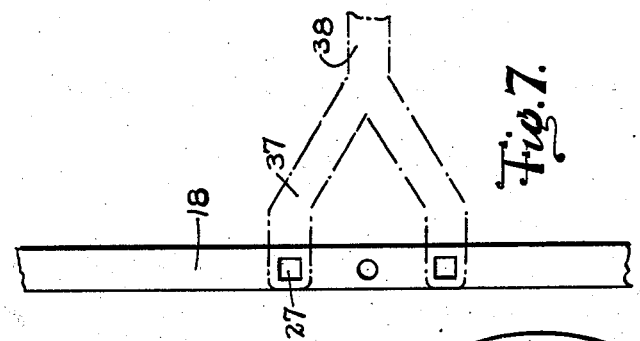
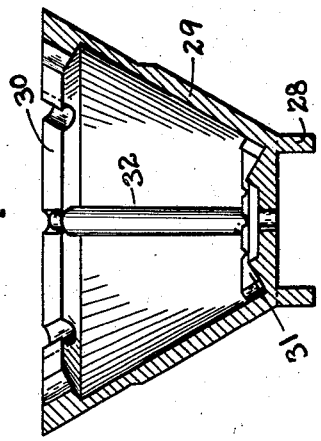
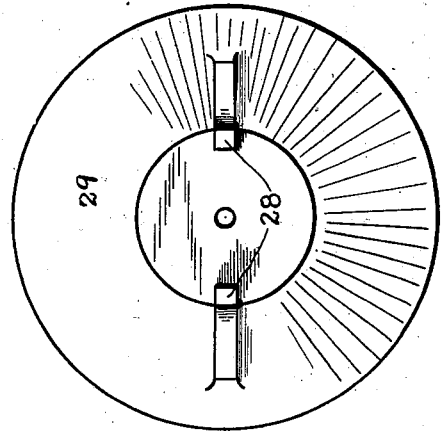
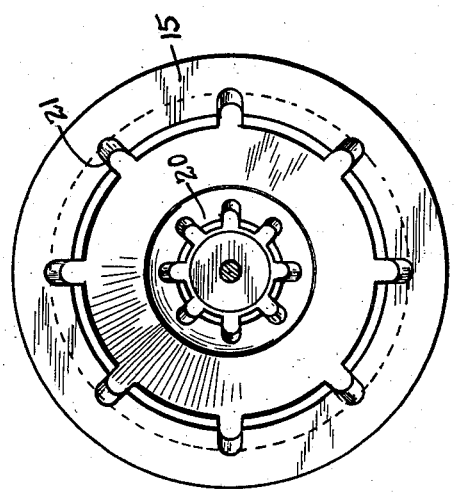
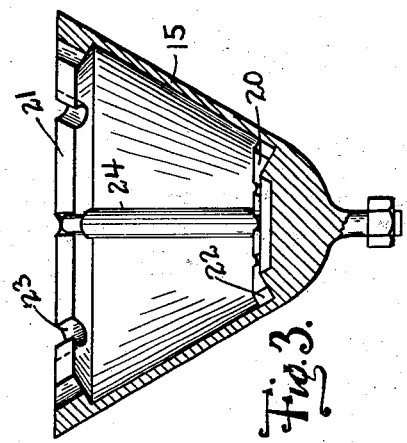
Witnesses
Charles Morgan
Ethel M. Colford.
Inventor.
H. W. GANDER.
Attorneys No. 744,742. Patented November 24, 1903.

UNITED STATES PATENT OFFICE.

HARRY W. GANDER, OF RUDY, PENNSYLVANIA.

BALL-BEARING FIFTH-WHEEL AND KING-BOLT.

SPECIFICATION forming part of Letters Patent No. 744,742, dated November 24, 1903.

Application filed August 14, 1903. Serial No. 169,416. (No model.)

*To all whom it may concern:*

Be it known that I, HARRY W. GANDER, a citizen of the United States, residing at Rudy, in the county of Montgomery, State of Pennsylvania, have invented certain new and useful Improvements in Ball-Bearing Fifth-Wheels and King-Bolts; and I do hereby declare the following to be a full, clear, and exact description of the invention, such as will enable others skilled in the art to which it appertains to make and use the same.

This invention relates to fifth-wheels for vehicles; and it has for its object to provide a construction which will permit of easy turning of the front axle while holding the parts thereof securely in proper positions and in which the coupling-bolt or king-bolt will be held securely while offering a minimum of friction.

In the drawings forming a portion of this specification, and in which like numerals of reference indicate similar parts in the several views, Figure 1 is a vertical section through the front axle and the front springs of a vehicle equipped with the present invention, the king-bolt being shown in elevation. Fig. 2 is a top plan view of Fig. 1. Fig. 3 is a sectional view of the lower bearing-casing with the bearing-rollers in place in a portion thereof. Fig. 4 is a top plan view of the lower bearing member with the springs removed. Fig. 5 is a view similar to Fig. 3, showing the bearing-casing with its wings. Fig. 6 is a bottom plan view of the upper bearing-casing. Fig. 7 is a top plan view of the top leaf of the lower half of the front spring.

Referring now to the drawings, there is shown the front axle 10 of a vehicle through which is engaged the lower end of a king-bolt 11, upon which below the axle is screwed a retaining-nut 12. The king-bolt has an enlarged portion 13, which enters the recess 14 in the upper face of the axle and into which it is drawn by the nut 12, so that the bolt is rigid with respect to the axle.

Disposed upon the king-bolt and resting with its minor end upon the enlargement 13 is an inverted frusto-conical bearing-casing 15, upon the upper end of which is disposed a cap 16, having a depending flange 17, which incloses the upper end of the casing and prevents access of dirt thereto. The cap 16 has a central perforation through which the king-bolt is passed, and upon this cap are held the leaves 18 of the lower half of the front springs of the vehicle by means of the clamping-bolts 19.

In the lower end of the casing 15 is disposed an annular rack 20, and in the upper end of the casing is disposed a second annular rack 21, these racks having journals 22 and 23, respectively, formed therein and in which are received the trunnions at the ends of bearing-rollers 24, which latter converge downwardly in conformity with the taper of the casing.

Upon the inner or upper faces of the rollers 24 rests the bearing-cone 25, which is carried by the cap 16, and is thus held to the front spring of the vehicle.

From the perforation 26 in the upper leaf of the lower half of the front spring radiate the slots 27, and in these slots are received the wings 28 at diametrically opposite points of the outer surface of a second inverted frusto-conical bearing-casing 29, the lower end of which is received in the perforation 26. In the upper and lower ends of the casing 29 are disposed annular racks 30 and 31, respectively, in which are journaled the trunnions at the ends of bearing-rollers 32, which converge downwardly in conformity with the taper of the casing.

Upon the bearing-rollers 32 is disposed a bearing-cone 33, which is carried by a cap 34, disposed upon the upper end of the casing 29 and having a depending flange 35, that incloses the upper end of the casing. A nut 36 is screwed onto the upper end of the king-bolt 11 and serves to hold both cones against upward movement out of contact with the bearing-rollers. This nut serves also to hold the lower end of the casing 29 and its wings 28 in engagement with the openings in the upper leaf 18 of the vehicle-spring.

The bolts 19, that connect the springs with the cap 16, serve also to hold the arms 37 of the perch-rod 38 to the spring.

In practice modifications of the specific construction shown may be made and any suitable materials and proportions may be used for the various parts without departing from the spirit of the invention.

What is claimed is—

1. The combination with a vehicle-axle, of a king-bolt engaged therewith, a bearing-casing carried by the king-bolt and having antifriction devices therein, a bearing-cone disposed in the casing and resting upon the antifriction devices, the front spring connected with the bearing-cone, a bearing-casing secured to the spring, antifriction devices in the second bearing-casing, and a second bearing-cone secured to the king-bolt and engaged with its minor end downwardly into the second bearing-casing and in contact with the antifriction devices therein.

2. The combination with a vehicle-axle, of a king-bolt engaged therewith, an inverted frusto-conical bearing-casing supported upon the king-bolt, antifriction devices in the bearing-casing, a cap for the bearing-casing, a bearing-cone attached to the cap and disposed against the antifriction-rollers, a spring secured upon the cap and through which the king-bolt is passed, a second inverted frusto-conical bearing-casing having radiating wings, said second bearing-casing being disposed to encircle the king-bolt and having its lower end and its wings engaged in corresponding openings in the spring, antifriction-rollers in the second bearing-casing, a bearing-cone mounted upon the king-bolt and resting upon the last-named rollers, a cap for the second bearing-casing secured to the second cone and means engaged with the king-bolt and impinging against the cap for holding the second cone against upward movement.

In testimony whereof I affix my signature in presence of two witnesses.

HARRY W. GANDER.

Witnesses:
   H. B. UPDOGU,
   AMELIA C. SLOTTERER.